United States Patent
Zhu et al.

(10) Patent No.: US 9,341,516 B2
(45) Date of Patent: May 17, 2016

(54) SYSTEM FOR PERFORMING OPTICAL SPECTROSCOPY INCLUDING INTERFEROMETER

(71) Applicant: AGILENT TECHNOLOGIES, INC., Loveland, CO (US)

(72) Inventors: Miao Zhu, San Jose, CA (US); Adam Kleczewski, San Francisco, CA (US); Robert C. Taber, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 105 days.

(21) Appl. No.: 14/015,529

(22) Filed: Aug. 30, 2013

(65) Prior Publication Data
US 2015/0062586 A1 Mar. 5, 2015

(51) Int. Cl.
*G01B 9/02* (2006.01)
*G01J 3/45* (2006.01)
*G01J 3/453* (2006.01)

(52) U.S. Cl.
CPC .. *G01J 3/45* (2013.01); *G01J 3/453* (2013.01); *G01J 3/4535* (2013.01)

(58) Field of Classification Search
CPC ........... G01J 3/45; G01J 3/453; G01J 3/4532; G01J 3/4535; G01J 3/4537; G01J 3/457; G01N 21/4795
See application file for complete search history.

(56) References Cited

U.S. PATENT DOCUMENTS

| | | | |
|---|---|---|---|
| 3,897,154 A * | 7/1975 | Hawes | ............................ 356/51 |
| 4,759,628 A | 7/1988 | Tatsuno et al. | |
| 4,999,010 A | 3/1991 | Mattson et al. | |
| 5,748,309 A | 5/1998 | van der Weide et al. | |
| 6,201,608 B1 * | 3/2001 | Mandella et al. | ............. 356/491 |
| 6,233,054 B1 * | 5/2001 | Theriault | ...................... 356/451 |
| 6,963,405 B1 * | 11/2005 | Wheel et al. | ................... 356/456 |
| 7,079,252 B1 | 7/2006 | Debreczeny et al. | |
| 8,358,420 B1 * | 1/2013 | DeWitt et al. | .................. 356/452 |
| 2007/0291255 A1 * | 12/2007 | Larsen et al. | .................... 356/73 |
| 2014/0336972 A1 * | 11/2014 | Juhl | .............................. 702/104 |

OTHER PUBLICATIONS

Ian Coddington et al., "Coherent Multiheterodyne Spectroscopy Using Stabilized Optical Frequency Combs", Physical Review Letters, Jan. 11, 2008, 100, pp. 013902-1 to 013902-4.

Magnus W. Haakestad et al., "Intracavity trace molecular detection with a broadband mid-IR frequency comb source", J. Opt. Soc. Am. B, vol. 30, No. 3, Mar. 2013, pp. 631-640.

Aleksandra Foltynowicz et al., "Quantum-Noise-Limited Optical Frequency Comb Spectroscopy", Physical Review Letters, Dec. 2, 2011, 107, pp. 233002-1 to 233002-5.

* cited by examiner

*Primary Examiner* — Michael A Lyons

(57) ABSTRACT

A system for performing optical spectroscopy measurements includes a light source for generating an input optical beam and an interferometer. The interferometer includes a beam splitter that splits the input optical beam into first and second light beams; a first light path that directs the first light beam through a sample containing an analyte to a first output port; and a second light path that directs the second light beam to the first output port. At least one of the first and second light paths adjusts a relative phase of a corresponding one of the first and second light beams, so that the first and second light beams are out of phase at the first output port, substantially canceling background light and outputting sample light corresponding to a portion of the first light signal absorbed by the sample in the sample cell. A detection system detects the output sample light.

21 Claims, 6 Drawing Sheets

SYSTEM FOR PERFORMING OPTICAL SPECTROSCOPY INCLUDING INTERFEROMETER

BACKGROUND

In many optical spectroscopy applications, a user wants to measure an absorption signal caused by the presence of a small quantity of a sample analyte. In this case, the fractional change in the amount of light incident on the detector caused by sample absorption may be smaller than intensity fluctuations in the light source, making an accurate absorption measurement impossible. Reducing the intensity of the light source reduces the amplitude of the intensity fluctuations, however it also reduces the magnitude of the absorption signal such that the signal-to-noise ratio of the measurement does not improve. What is needed is a method of reducing background light on the detector without reducing the magnitude of the absorption signal by the same fractional amount. Such a technique would increase the signal-to-noise ratio, making the measurement sensitive to smaller absorption signals that otherwise would have been buried in laser intensity noise.

In the time domain, the width of a single pulse from a mode-locked laser may be less than 1 picosecond (ps), and the time interval between adjacent light pulses (pulse interval) may be on the order of 10 nanoseconds (ns). In the frequency domain, the output of the pulsed light source consists of a large number of evenly spaced frequency components. The initial phases of these frequency components are aligned so that these frequency components cancel each other in the time interval between two adjacent light pulses, such that there is essentially no light between the adjacent light pulses. However, upon passing through a sample, some frequency components of the pulse train which are in the vicinity of transitions of the sample analytes are partially attenuated and/or phase shifted. This interaction with the sample disrupts the careful balance among the many modes in the pulsed laser's frequency spectrum. The result is that a small of amount of light is introduced in the laser beam during the time interval between pulses. Furthermore, the spectrum of this intra-pulse will be determined by the absorption spectrum of the sample analyte. An interferometric method for removing the unabsorbed light present during the laser pulses, which allows one to perform background free spectroscopy on the intra-pulse light, is therefore desired.

SUMMARY

In a representative embodiment, a system for performing optical spectroscopy measurements includes a light source configured to generate an input optical beam, an interferometer configured to receive the input optical beam generated by the light source, and a detection system. The interferometer includes a beam splitter configured to split the input optical beam into a first light beam and a second light beam; a first light path configured to direct the first light beam through a sample to a first output port, the sample containing an analyte of interest; and a second light path configured to direct the second light beam to the first output port. At least one of the first light path and the second light path is further configured to adjust a relative phase of a corresponding at least one of the first light beam and the second light beam, respectively, so that the first light beam and the second light beam are out of phase at the first output port, substantially canceling background light and outputting sample light corresponding to a portion of the first light signal absorbed by the sample in the sample cell. The detection system is configured to detect the sample light output at the first output port.

In another representative embodiment, a method is provided for performing optical spectroscopy measurements. The method includes splitting an input optical beam into a first light beam and a second light beam; directing the first light beam through a first light path to a first output port, the first light beam passing through a sample containing an analyte of interest; directing the second light beam through a second light path to the first output port; adjusting phase of at least one of the first light beam and the second light beam so that the first light beam and second light beam are out of phase to substantially cancel background light, and adjusting intensity of at least one of the first light beam and the second light beam so that the first and second light beams have approximately equal intensities; outputting from the first output port an output optical beam corresponding to a portion of the first light beam absorbed by the sample in the first light path; and detecting a spectrum of the sample from the optical beam output at the first output port.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Figure 1A:
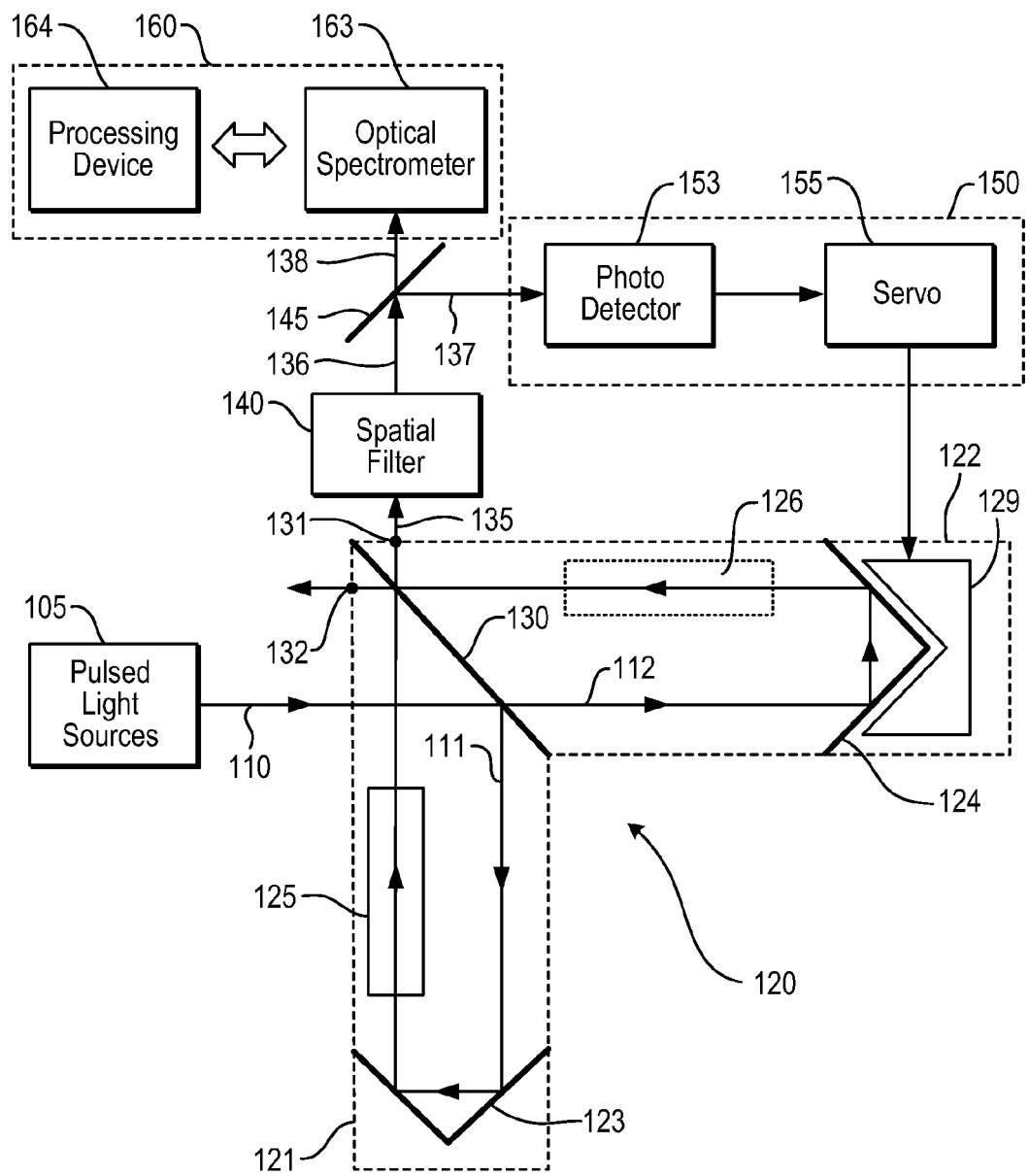
FIG. 1A is a block diagram illustrating an optical spectroscopy system including an interferometer, according to a representative embodiment.

FIG. 1A is a block diagram illustrating an optical spectroscopy system including a Michelson interferometer, according to a representative embodiment.

Referring to FIG. 1A, optical spectroscopy system 100 includes pulsed light source 105 and interferometer 120. The pulsed light source 105 is configured to generate an input optical beam 110 comprising a pulse train, which includes light pulses separated by pulse intervals, as discussed above. Each light pulse has a relatively small pulse width (e.g., less than about 1 ps) as compared to the pulse intervals. Each pulse interval is the reciprocal of the repetition rate of the pulse train, and may be about 10 ns, for example. The values of pulse width and pulse interval are given by way of example, and it should be understood that pulse trains having other values of pulse width and pulse interval may be used, without departing from the scope of the present teachings. The pulsed light source 105 may be a pulsed laser, a mode-locked pulse laser, a Q-switched laser, an optical parametric oscillator, or an output of a nonlinear optical process, for example.

Figure 1B:
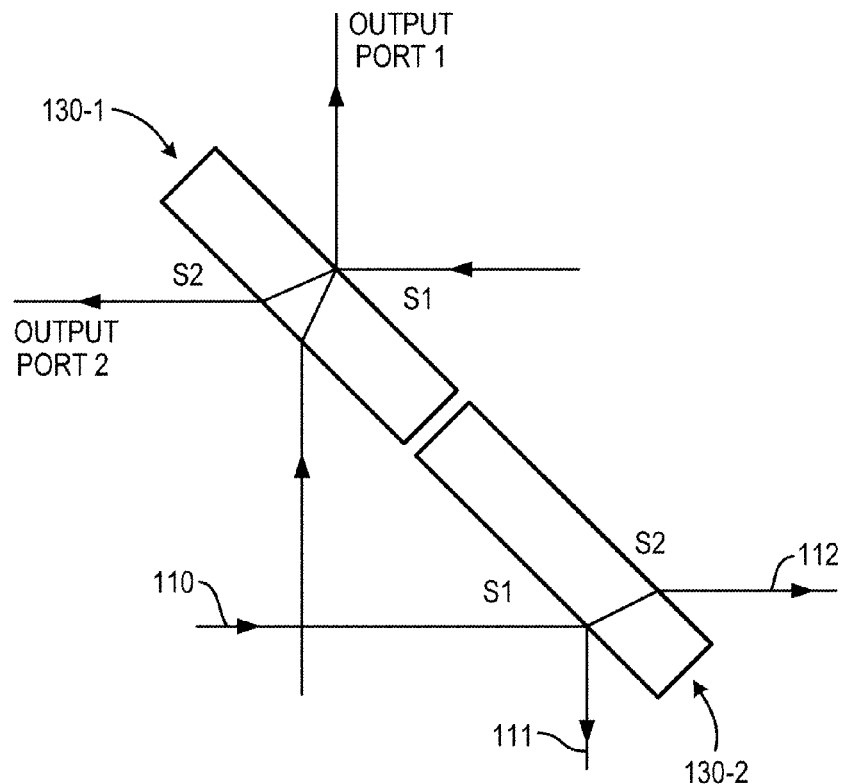
FIG. 1B is a block diagram illustrating a beam splitter of the interferometer in FIG. 1A, according to a representative embodiment.

The interferometer 120 may be a Michelson interferometer, for example. The interferometer 120 includes a beam splitter 130 configured to split the optical beam 110 into a first light beam 111 and a second light beam 112. FIG. 1B shows an example one of one possible implementation of the beam splitter 130, according to a representative embodiment. Referring to FIG. 1B, the beam splitter 130 consists of two smaller beam splitters 130-1 and 130-2. Surfaces S1 have a beam splitter optical coating while surfaces S2 have an anti-reflection optical coating. The substrate materials, thicknesses, and optical coatings of the two smaller beam splitters 130-1 and 130-2 are substantially same. In fact, they may be cut from the same large beam splitter after the optical coatings are applied to the substrate. This configuration compensates for the dispersion and/or the absorption of the beam splitter substrate material. Other means of forming the small beam splitter 130-1 and 130-2 and/or other implementations of the beam splitter 130 may be incorporated without departing from the scope of the present teachings.

The first and second light beams 111 and 112 may have the substantially the same intensity or different intensities in various configurations. The interferometer 120 further includes a first interferometer arm 121 and a second interferometer arm 122 following the beam splitter 130. The first and second interferometer arms 121 and 122 provide first and second light paths for the first and second light beams 111 and 112, respectively. In the depicted embodiment, the first interferometer arm 121 includes a first reflector 123 and a sample cell 125, and the second interferometer arm 122 includes a second reflector 124 and a reference cell 126 (optional). In the illustrative configuration shown in FIG. 1A, the first and second reflectors 123 and 124 are shown as corner cubes. However, the first and second reflectors 123 and 124 may be implemented using various other means of reflecting light beams, such as plane mirrors, "cat's eyes," roof prisms, retroreflectors, and the like, without departing from the scope of the present teachings.

The sample cell 125 is configured to contain a sample being analyzed. The sample may contain any type of analyte(s), such as molecules, atoms, ions or other absorbers, having spectral features, including at least one analyte of interest. Notably, in various configurations, the sample cell 125 may not be required, as long as the sample can be otherwise positioned in the first light path for the first light beam 111 to pass through it. For example, the sample may be a solid or a liquid sample held in the sample cell 125, or a vapor sample in free space (in the air), or a vapor sample within the sample cell 125. When the sample cell 125 is used, the reference cell 126 is optionally positioned in the second light path, as shown. The reference cell 126 has substantially the same characteristics as the sample cell 125, although the reference cell 126 does not contain the same amount of the analyte of interest in order to compensate for dispersion and/or absorption of the first light beam, e.g., caused by cell windows of the sample cell and analytes in the sample other than the analyte of interest. The optical beam 110 generated by the pulsed light source 105 (and more particularly, the first light beam 111) is used to excite analytes (the quantum absorbers) in the sample. Generally, the pulse widths of the optical beam 110 are (much) shorter than the lifetimes of the interested excited states of the sample analytes. Therefore the spectrum of the pulsed light source 105 in the frequency domain is broader than the spectral features of the sample analytes.

In the depicted embodiment, the optical path length of the second light path defined by the second interferometer arm 122 is adjustable, such that the phase of the second light beam 112 may be adjusted relative to the phase of the first light beam 111. For example, the phase of the second light beam 112 may be adjusted to be about 180 degrees out of phase with the first light beam 111 at the first output port 131. Under this condition, light from the first and second light beams 111 and 112 interfere destructively at the first output port 131 and constructively at the second output port 132. Further, in the depicted embodiment, the second reflector 124 is mounted on a controllable electromechanical actuator 129, for example, a piezoelectric actuator formed by lead zirconium titanate (PZT) material, to enable adjusting the optical path length of the second light path. For example, a dithering-phase-sensitive detection method may be used to selectively position the electromechanical actuator mounted second reflector 124 (thus adjusting the optical path length of the second light path) by using a servo system (e.g., including photodetector 153 and servo circuit 155, discussed below). However, other means (for example, a motor mounted reflector, an electro-refractive-index actuator such as an electrooptic modulator to change the refractive index in the light path, or a chamber with controllable pressure in the light path) of adjusting the phase of the second light beam 112 (and/or the phase of the first light beam 111) may be implemented without departing from the scope of the present teachings. Also, throughout this description, actuators other than PZT actuators may be incorporated, such as motors, for adjusting optical path lengths of interferometer arms. Also, multiple actuators may be used to adjust the optical path lengths of interferometer arm.

The first light beam and the second light beam are adjusted to be out of phase to the extent that the background light is substantially canceled, and thus the output sample light corresponds to a portion of the first light beam absorbed by the sample in the sample cell 125. For example, by adjusting the phase of the second light beam 112 to be about 180 degrees out of phase with the first light beam 111, background light of the first and second light beams 111 and 112 substantially cancel out at the first output port 131. Therefore, the only light output from the first output port 131 is sample light beam 135, which is a portion of light from the second light beam 112 in the second light path that corresponds to a portion of light from the first light beam 111 absorbed by the sample (e.g., in the sample cell 125) in the first light path. When there is no sample in the first light path (e.g., when the sample cell 125 is empty (in vacuum)), the first and second light beams 111 and 112 would be entirely canceled at the first output port 131 when the first and second light beams 111 and 112 are 180 degrees out of phase.

A spatial filter 140 and a (optional) polarizer (not shown) of the optical spectroscopy system 100 may be included following the first output port 131. The polarizer may be configured to define polarization of the sample light at the first output port 131. The spatial filter 140 is configured to make corrections in the sample light beam 135 resulting from disparities, e.g., in beam size and wave front, between the first and second light beams 111 and 112. The spatial filter 140 may be implemented using various types of filters, including a pinhole filter or a single mode optical fiber filter, for example. The polarizer is configured to ensure that the first light beam 111 and the second light beam 112 have the same polarization at the first output port 131.

In various embodiments, at least one of the first interferometer arm 121 and the second interferometer arm 122 includes one or more additional optical elements (not shown), such a variable optical attenuator, a polarizer, a half waveplate, and a mechanism to misalign the first and second light beams 111 and 112, respectively. The purpose of such optical elements is to keep the optical power (or intensity) of the first light beam 111 substantially the same as the optical power (or intensity) of the second light beam 112 at the first output port 131, e.g., after the spatial filter 140 and/or the polarizer. These optical elements also minimize total optical power emerging from the first output port 131 when there is no sample in the first light path (e.g., when the sample cell 125 is empty (in vacuum)).

This adjusting method is suitable when samples are at low pressure. In various configurations, the analytes of the samples may be measured in some background gases, for example, at ambient atmospheric pressure. In this case, the difference in optical path length between the first and second light paths of the first and second interferometer arms 121 and 122 may be adjusted when the sample cell 125 has the same (or similar) pressure without the sample analytes, so that the optical power at the first output port 131 is minimized under this condition.

It is understood that, in alternative embodiments, the sample and/or the sample cell 125 may be located in either of the first interferometer arm 121 or the second interferometer arm 122, without departing from the scope of the present teachings. Likewise, either (or both) of the first interferometer arm 121 or the second interferometer arm 122 may be configured to provide an adjustable first light path or adjustable second light path, without departing from the scope of the present teachings. Also, the sample and/or the sample cell 125 may be positioned in either an interferometer arm with a non-adjustable light path (e.g., first interferometer arm 121) or an interferometer arm with an adjustable light path (e.g., second interferometer arm 122). The reference cell 126 would be in the other light path, as needed.

The optical spectroscopy system 100 further includes a beam splitter 145, a feedback system 150, and a detection system 160. In the depicted embodiment, the spatial filter 140 is connected to the first output port 131 to receive the sample light beam 135 from the interferometer 120, and to output a filtered light beam 136. Of course, in alternative embodiments, the spatial filter 140 may be connected to the second output port 132 to receive essentially the same sample light beam derived by subtracting the first and second light beams 111 and 112, where the relative phase difference between the first and second light beams 111 and 112 has been adjusted to be about 180 degrees, without departing from the scope of the present teachings. Thus, when the relative phase difference between the first and second light beams 111 and 112 is 180 degrees at first output port 131, the relative phase difference between the first and second light beams 111 and 112 is 0 degrees at second output port 132. Therefore, when the spatial filter 140 is connected to the second output port 132, the position of the second reflector 124 is slightly different from its position when the spatial filter 140 is connected to the first output port 131.

The filtered light beam 136 is split into a first filtered light beam 137 and a second filtered light beam 138 by the beam splitter 145. The first filtered light beam 137 is provided to the feedback system 150, which controls movement of the electromechanical actuator 129 in response, so that the relative phases of the first and second light beams 111 and 112 are properly adjusted, as discussed above. More particularly, the feedback system 150 includes a photodetector 153 and a servo circuit 155. The photodetector 153 is configured to detect the first filtered light beam 137, and to output a corresponding electric signal. The servo circuit 155 receives the input electric signal from the photodetector 153 to generate a the feedback control signal, and in response controls the electromechanical actuator 129 to move the second reflector 124 in order to vary the optical path length of the second light path, as desired. The servo circuit 155 could be an analog circuit, or a digital circuit, or a mix of the analog circuit and the digital circuit, or a computer, or the like. Of course, other means of adjusting the second reflector 124 (and/or the first reflector 123) may be incorporated without departing from the scope of the present teachings.

The second filtered light beam 138 is provided to the detection system 160 for spectral analysis. In the depicted embodiment, the detection system 160 includes an optical spectrometer 163 and a processing unit 164. The second filtered light beam 138 enters the optical spectrometer 163 for detection and spectral analysis. The optical spectrometer 163 may be dispersion-based or interference-based. For example, the optical spectrometer 163 may be a Fourier transform spectrometer, a combination of a virtual image phase array (VIPA) and a two-dimensional detector array (e.g., a camera), or a combination of an echelle grating and a regular grating plus two-dimensional detector array, or the like. In the depicted configuration, the optical power detected by the optical spectrometer 163 is minimum when the sample is not in the first light path (e.g., the sample cell 125 is empty). Absorption of portions of the first light beam 111 by analytes in the sample change the relative intensity and the relative phase of the first and second light beams 111 and 112 from first and second interferometer arms 121 and 122, respectively. The optical power at the first output port 131 changes accordingly. Thus the detection background is suppressed, and the detection system 160 provides the spectral analysis of the light absorbing analytes.

In various embodiments, the processing unit 164 may be implemented using one or more processing devices, such as a computer, a processor, a microprocessor, a digital signal processor (DSP), one or more application specific integrated circuits (ASICs), one or more FPGAs, or combinations thereof, using software, firmware, hard-wired logic circuits, or combinations thereof. The processing unit 164 may have access to memory (not shown), comprising a non-transitory computer readable medium for storing operating software, modules, data and algorithms for executing the various embodiments described herein, including spectral determination and/or analysis of the analyte(s) of interest. Examples of a computer readable medium include various types of non-volatile read only memory (ROM) and volatile RAM, such as erasable programmable ROM (EPROM), electrically erasable programmable ROM (EEPROM), static RAM (SRAM), dynamic RAM (DRAM), Block RAM, a disk drive, a CD, a DVD, a universal serial bus (USB) drive, and the like.

Figure 2:
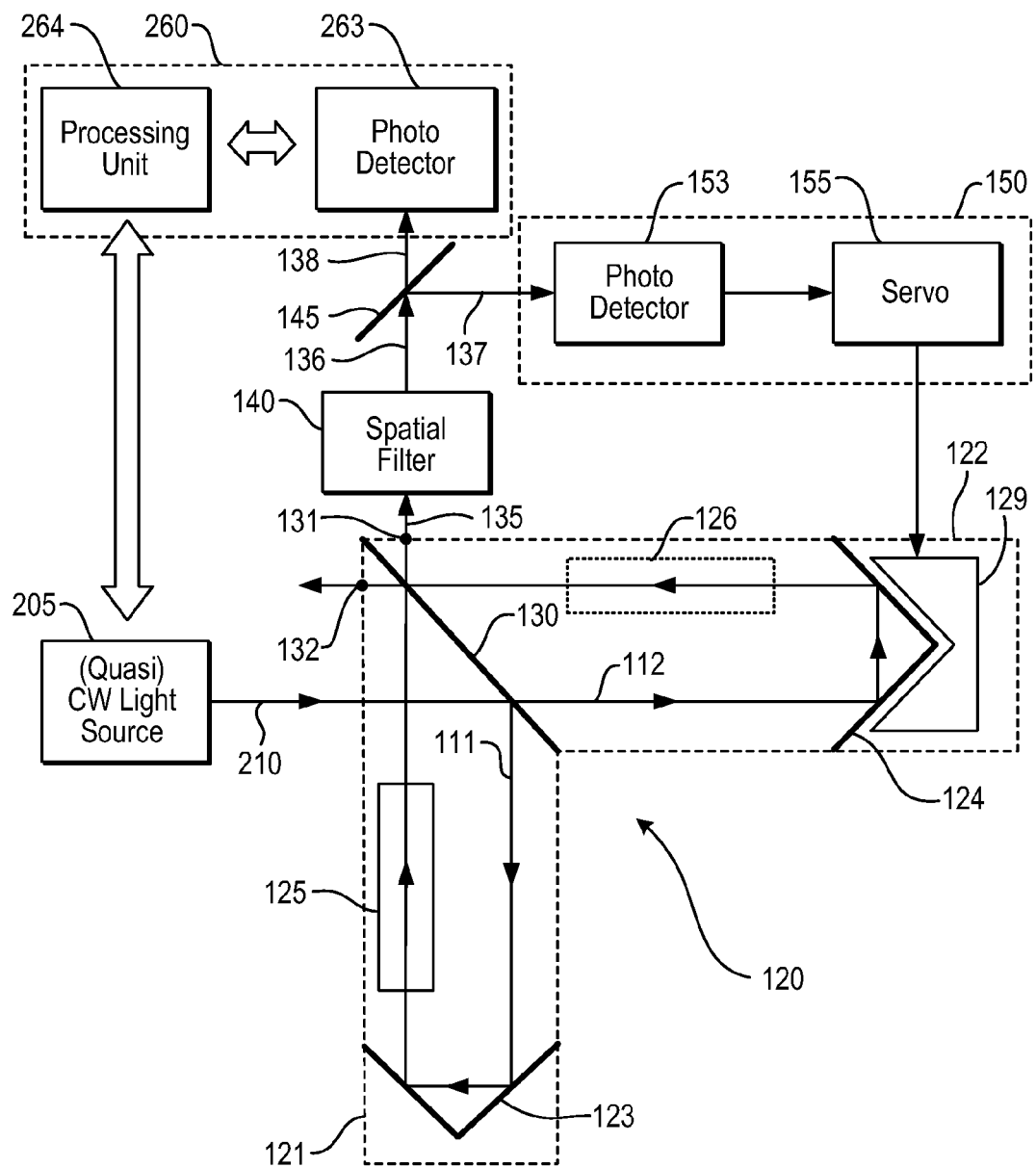
FIG. 2 is a block diagram illustrating an optical spectroscopy system including an interferometer, according to another representative embodiment.

FIG. 2 is a block diagram illustrating an optical spectroscopy system including an interferometer, according to another representative embodiment.

Referring to FIG. 2, optical spectroscopy system 200 includes a continuous wave (CW) light source 205, interferometer 120, spatial filter 140, beam splitter 145, feedback system 150 and detection system 260. The interferometer 120, the spatial filter 140, the beam splitter 145, and the feedback system 150 are substantially the same as discussed above with regard to FIG. 1A, and therefore descriptions thereof will not be repeated.

The continuous wave light source 205 may be a laser, such as a frequency (wavelength) tunable semiconductor lasers. It is understood that the continuous wave light source 205 may alternatively be a quasi-continuous wave light source, without departing from the scope of the present teachings. The continuous wave light source 205 is configured to generate an input optical beam 210.

The spectrum of the continuous wave light source 205 is usually narrower than the spectral features of the sample analytes. Therefore, the center frequency (or center wavelength) of the continuous wave light source 205 is tuned in the measurements by processing unit 264 in the detection system 260 to cover the desired spectral range (thus there is no need for an optical spectrometer, such as the optical spectrometer 163 in FIG. 1A). Rather, the detection system 260 includes a photodetector 263 for detecting the second filtered light beam 138 from the beam splitter 145, in place of the optical spectrometer 163. The processing unit 264 communicates with the continuous wave light source 205 to identify the frequency (or wavelength) of the input optical beam 210 when the signal detected by the photodetector 263 from the second filtered light beam 138 is recorded.

The working principle is substantially the same as that of the optical spectroscopy system 100 shown in FIG. 1A. The optical power at the photodetector 263 is minimized when there is no sample in the first interferometer arm 121 (e.g., when the sample cell 125 does not contain the analyte of interest).

Figure 3:
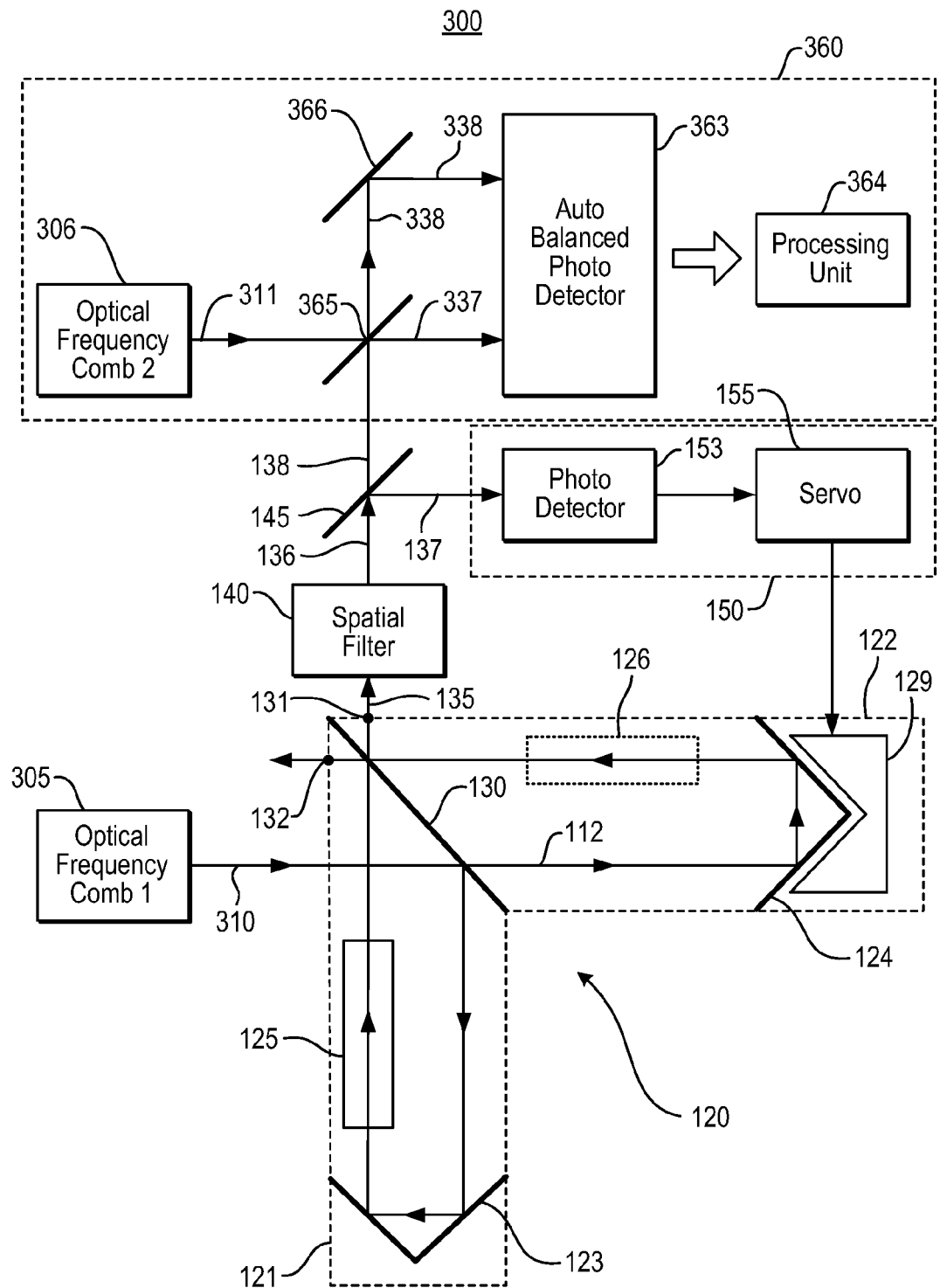
FIG. 3 is a block diagram illustrating an optical spectroscopy system including an interferometer, according to a representative embodiment.

FIG. 3 is a block diagram illustrating an optical spectroscopy system including an interferometer, according to a representative embodiment.

Referring to FIG. 3, optical spectroscopy system 300 includes first optical frequency comb 305 and second optical frequency comb 306 as light sources, as discussed below. In addition, the optical spectroscopy system 300 includes interferometer 120, spatial filter 140, beam splitter 145, feedback system 150 and detection system 360. The interferometer 120, the spatial filter 140, the beam splitter 145, and the feedback system 150 are substantially the same as discussed above with regard to FIG. 1A, and therefore descriptions thereof will not be repeated.

The first optical frequency comb 305 is configured to generate a first input optical beam 310, effectively replacing the pulsed light source 105 shown in FIG. 1A. Thus, the working principle of the first optical frequency comb 305 together with the interferometer 120 and the feedback system 150 to output the sample light beam 135 from the first output port 131 is substantially the same as discussed above with regard to FIG. 1.

However, the detection system 360 does not utilize an optical spectrometer (such as the optical spectrometer 163 in FIG. 1A) for detection and spectral analysis. Rather, the detection system 360 includes the second optical frequency comb 306 to generate a second input optical beam 311. The carrier frequency of the second optical frequency comb 306 is substantially the same as the carrier frequency of the first optical frequency comb 305, while the repetition rates of the first and second optical frequency combs 305 and 306 are slightly different.

More particularly, the detection system 360 includes the second optical frequency comb 306, beam splitter 365, mirror 366, auto-balanced photodetector 363, and processing unit 364. The beam splitter 365 combines the second filtered light beam 138 received from the beam splitter 145 and the second input optical beam 311 received from the second optical frequency comb 306. As a result, the beam splitter 365 provides a first combined light beam 337 and the second combined light beam 338. In an alternative configuration, either of the first combined light beam 337 and the second combined light beam 338 can be detected by a regular photodetector in place of the auto-balanced photodetector 363 to extract the spectral information of the sample. This arrangement provides so-called "dual comb spectroscopy" or "multiheterodyne spectroscopy," which is essentially a Fourier spectroscopy in time domain without mechanical moving parts, as described for example by van der Weide et al. in U.S. Pat. No. 5,748,309 (May 5, 1998), which is hereby incorporated by reference. In this configuration, if the beam 337 is detected by a regular photodetector, there would be no need for the mirror 366 or use for the second combined light beam the 338. However, the optical frequency combs may have intensity noise which shows in the combined light beams 337 and 338. This intensity noise limits detection sensitivity. Accordingly, the auto-balanced photodetector 363 is configured to remove the intensity noise and preserve the desired spectral information in the first and second combined light beams 337 and 338. The beam splitter 365 and mirror 366 guide the first and second combined light beams 337 and 338 to the auto-balanced photodetector 363. One of the first and second combined light beams 337 and 338 (e.g., the one with more power) is the reference light beam for the auto-balance photodetector 363 while the other is the signal light beam for the auto-balance photodetector 363.

Thus, the sample light beam 135 emerging from the first output port 131 of the interferometer 120 (and filtered by the spatial filter 140 and split by the beam splitter 145) is effectively sampled by the second input optical beam 311 of the second optical frequency comb 306 and detected by the auto-balanced photodetector 363 in time domain. The detected signal in time domain is converted to a digital signal by an analog-to-digital converter (ADC) (not shown), and then converted by the processing unit 364 to frequency domain absorptions of the sample analytes using a Fourier transform, for example. Ultimately the operation mode of the optical spectroscopy system 300 could reach shot noise limited detection sensitivity, where the shot noise is mainly from the optical power of the second optical frequency comb 306. As mention above, shot noise of background light on a photodetector generally sets detection sensitivity.

Figure 4:
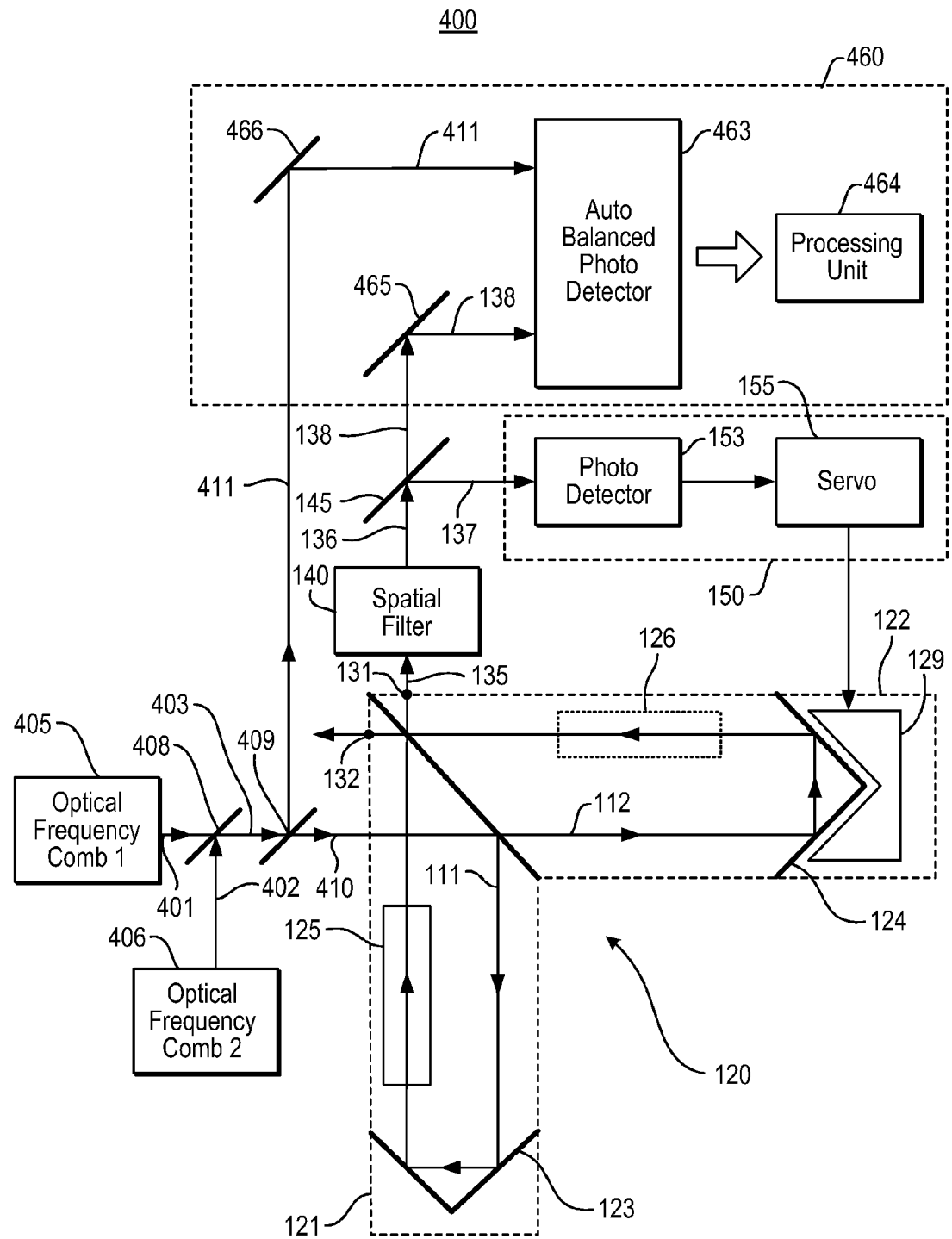
FIG. 4 is a block diagram illustrating an optical spectroscopy system including an interferometer, according to a representative embodiment.

FIG. 4 is a block diagram illustrating an optical spectroscopy system including an interferometer, according to a representative embodiment. FIG. 4 shows an alternative setup for a dual optical frequency comb measurement to increase the dynamic range. Here, the output beams from both of the optical frequency combs are combined before entering the interferometer, which suppresses the total background optical power.

Referring to FIG. 4, optical spectroscopy system 400 includes first optical frequency comb 405 and second optical frequency comb 406 as light sources, as discussed below. In addition, the optical spectroscopy system 400 includes interferometer 120, spatial filter 140, beam splitter 145, feedback system 150 and detection system 460. The interferometer 120, the spatial filter 140, the beam splitter 145, and the feedback system 150 are substantially the same as discussed above with regard to FIG. 1A, and therefore descriptions thereof will not be repeated.

The first optical frequency comb 405 is configured to generate a first optical beam 401 and second optical frequency comb 406 is configured to generate a second optical beam 402. The carrier frequencies of the first optical comb 405 and the second optical comb 406 are substantially the same, while the repetition rates of the first and second optical frequency combs 405 and 406 are slightly different. A beam splitter 408 combines the first and second optical beams 401 and 402 into combined optical beam 403. This arrangement provides so-called "dual comb spectroscopy" or "multiheterodyne spectroscopy," which is essentially a Fourier spectroscopy in time domain without mechanical moving parts, as described for example by van der Weide et al. in U.S. Pat. No. 5,748,309 (May 5, 1998), which is hereby incorporated by reference. The combined optical beam 403 is split by a beam splitter 409 into a first split portion, which becomes the input optical beam 410 input to the interferometer 120, and a second split portion which is the detector optical beam 411 input to the detection system 460. The first and second frequency combs 405 and 406 effectively replace the pulsed light source 105 shown in FIG. 1A. Thus, the working principle of the first and second optical frequency combs 405 and 406 together with the interferometer 120 and the feedback system 150 to output the sample light beam 135 from the first output port 131 is substantially the same as discussed above with regard to FIG. 1A.

The sample light beam 135 emerging from the first output port 131 of the interferometer 120 is filtered by the spatial filter 140, and split by the beam splitter 145 into a first filtered light beam 137 and a second filtered light beam 138. The first filtered light beam 137 is provided to the feedback system 150, which controls movement of the electromechanical actuator 129 in response, so that the relative phases of the first and second light beams 111 and 112 are properly adjusted to be 180 degrees out of phase, as discussed above.

The detection system 460 includes mirror 465, mirror 466, auto-balanced photodetector 463, and processing unit 464. The mirror 465 reflects the second filtered light beam 138 received from the beam splitter 145 to the auto-balanced photodetector 463 as the signal light beam, and the mirror 466 reflects the detector optical beam 411 to the auto-balanced photodetector 463 as the reference light beam. The auto-balanced photodetector 463 is configured to remove the intensity noise of the first and second optical frequency combs 405 and 406 in the signal light beam 138 and to detect the spectral information in the signal light beam 138, as discussed above with regard to FIG. 3. That is, the combined output (combined optical beam 403/detector optical beam 411) of the first and second optical frequency combs 405 and 406 is used as a reference signal for the auto-balanced photodetector 463 for cancellation of intensity noise in the sample light beam 135 output at the first output port 131. The detected signal is in time domain, and is converted by the processing unit 464 to frequency domain absorptions of the sample analytes using a Fourier transform, for example. As mentioned above, combining the outputs of the first and second optical frequency combs 405 and 406 prior to the interferometer 120 suppresses the total background optical power. In an alternative configuration, the signal light beam 138 can be detected by a regular photodetector in place of the auto-balanced photodetector 463 to extract the spectral information of the sample. In this configuration, there would be no need for mirror 466, the beam splitter 409 or the detector optical beam 411. In the depicted configurations, the spectroscopy system 300 in FIG. 3 detects amplitude of the signal absorption, while the spectroscopy system 400 in FIG. 4 detects intensity of the signal absorption.

Figure 5:
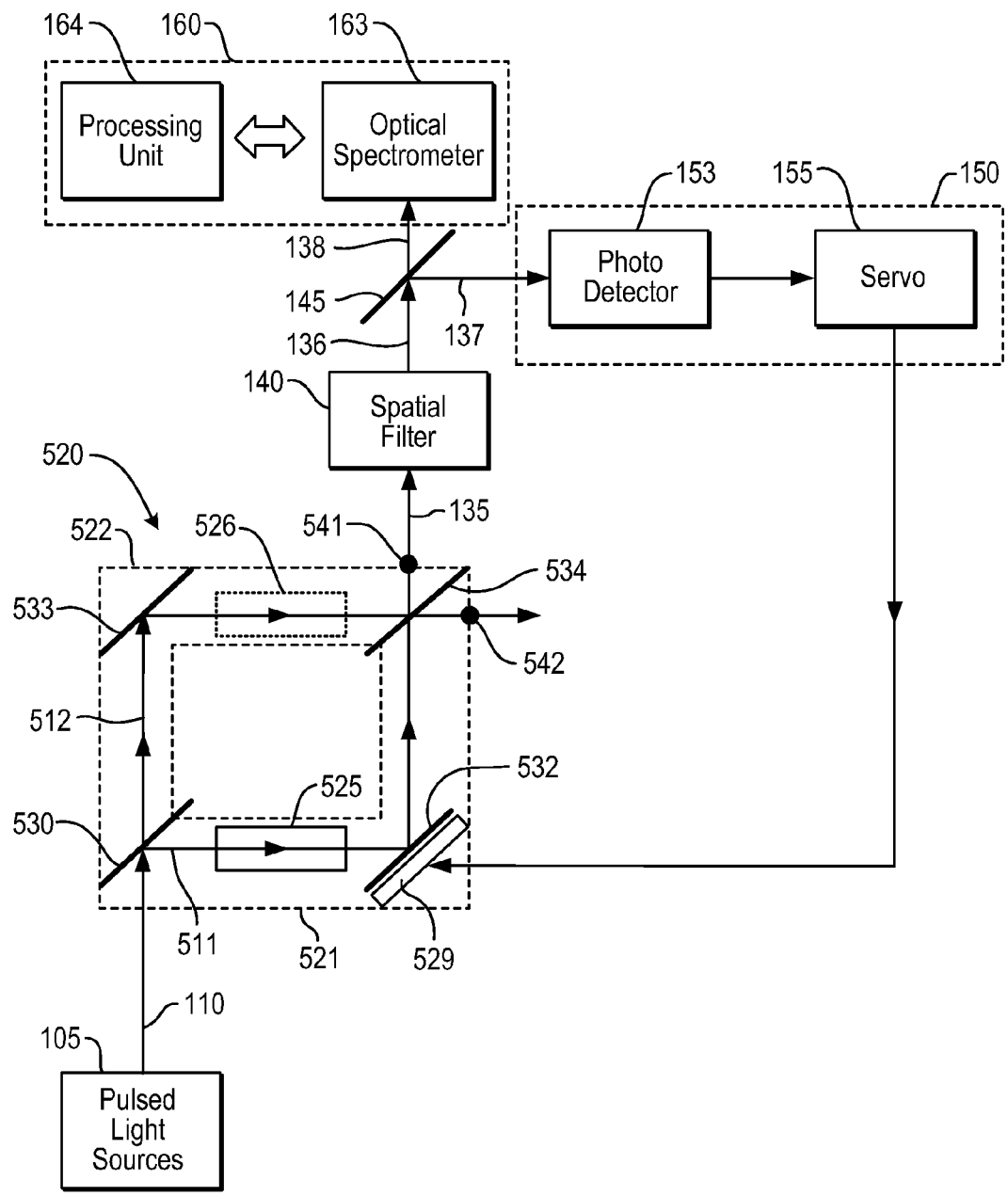
FIG. 5 is a block diagram illustrating an optical spectroscopy system including an interferometer, according to a representative embodiment.

FIG. 5 is a block diagram illustrating an optical spectroscopy system including a Mach-Zehnder interferometer, according to a representative embodiment.

Referring to FIG. 5, optical spectroscopy system 500 is similar in configuration and operation to the optical spectroscopy system 100 shown in FIG. 1A, except that a Mach-Zehnder interferometer is incorporated in place of a Michelson interferometer. Indeed, it is understood that each of the other embodiments of optical spectroscopy systems depicted in FIGS. 2 to 4 can likewise be implemented using Mach-Zehnder interferometers in place of Michelson interferometers, without departing from the scope of the present teachings.

The optical spectroscopy system 500 includes pulsed light source 105 configured to generate an input optical beam 110 comprising a pulse train, which includes light pulses separated by pulse intervals, as discussed above. The input optical beam 110 is provided to interferometer 520, which includes an initial beamsplitter 530 configured to split the optical beam 110 into a first light beam 511 and a second light beam 512. The first and second light beams 511 and 512 may have the substantially the same intensity or different intensities in various configurations. The interferometer 520 further includes a first interferometer arm 521 (from beam splitter 530 to reflector 532 to beam splitter 534) and a second interferometer arm 522 (from beam splitter 530 to reflector 533 to beam splitter 534) following the initial beam splitter 530. The first and second interferometer arms 521 and 522 provide first and second light paths for the first and second light beams 511 and 512, respectively.

In the depicted embodiment, the first interferometer arm 521 includes a sample cell 525 and a first reflector 532 (e.g., a plane mirror), and the second interferometer arm 522 includes a second reflector 533 (e.g., a plane mirror) and a reference cell 526 (optional). The first and second reflectors 532 and 533 respectively direct the first and second light beams 511 and 512 to beam splitter 534. The interferometer 520 also includes a first output port 541 and a second output port 542. The first output port 541 outputs portions of the first and second light beams 511 and 512 destructively combined by the beam splitter 534. The second output port 542 outputs portions of the first and second light beams 511 and 512 constructively combined by the beam splitter 534. For example, the first light beam 511 from the first interferometer arm 521 (after passing through the sample) may be destructively combined (subtracted) with the second light beam 512 from the second interferometer arm 522 by the beam splitter 534 and output at the first output port 541. Meanwhile, the first light beam 511 from the first interferometer arm 521 may be constructively combined (added) with the second light beam 512 from the second interferometer arm 522 by the beam splitter 534 and output at the second output port 532.

As discussed above, the sample cell 525 is configured to contain a sample being analyzed. The sample may contain any type of analyte(s), such as molecules, atoms, ions or other absorbers, having spectral features, including at least one analyte of interest. Notably, in various configurations, the sample cell 525 may not be required, as long as the sample can be otherwise positioned in the first light path for the first light beam 511 to pass through it. When the sample cell 525 is used, the optional reference cell 526 is positioned in the second light path, as shown. The reference cell 526 has substantially the same characteristics as the sample cell 525, although the reference cell 526 does not contain the same amount of the analyte(s) of interest in order to compensate for dispersion and/or absorption of the first light beam, e.g., caused by cell windows of the sample cell and analytes in the sample other than the analyte of interest.

In the depicted embodiment, the optical path length of the first light path defined by the first interferometer arm 521 is adjustable, such that the phase of the first light beam 511 may be adjusted relative to the phase of the second light beam 512. For example, the phase of the first light beam 512 may be adjusted to be about 180 degrees out of phase with the second light beam 512 at the first output port 541. In the depicted embodiment, the first reflector 532 is mounted on a controllable piezoelectric actuator 529, formed for example by PZT material, to enable adjusting the optical path length of the first light path under control of the feedback system 150, discussed above, for example. However, other means of adjusting the phase of the first light beam 511 (and/or the phase of the second light beam 512) may be implemented without departing from the scope of the present teachings.

By adjusting the phase of the first light beam 511 to be about 180 degrees out of phase with the second light beam 512, background light of the first and second light beams 511 and 512 substantially cancel out. Therefore, the only light output from the first output port 541 is sample light beam 135, which is a portion of light from the second light beam 512 in the second light path that corresponds to a portion of light from the first light beam 511 absorbed by the sample (e.g., in the sample cell 525) in the first light path. When there is no sample in the first light path (e.g., when the sample cell 525 is empty (in vacuum)), the background light of the first and second light beams 511 and 512 would be entirely canceled at the first output port 541 when the first and second light beams 511 and 512 are 180 degrees out of phase.

Generally, configuration and operation of the spatial filter 140, the beam splitter 145, the feedback system 150 and the detection system 160 in the optical spectroscopy system 500 are substantially the same as discussed above with regard to the optical spectroscopy system 100 in FIG. 1A, and therefore descriptions thereof will not be repeated. Also, it is understood that, in alternative embodiments, the sample and/or the sample cell 525 may be located in either of the first interferometer arm 521 or the second interferometer arm 522, without departing from the scope of the present teachings. Likewise, either (or both) of the first interferometer arm 521 or the second interferometer arm 522 may be configured to provide an adjustable first light path or adjustable second light path, without departing from the scope of the present teachings. Also, the sample and/or the sample cell 525 may be positioned in either an interferometer arm with an adjustable light path (e.g., first interferometer arm 521) or an interferometer arm with an non-adjustable light path (e.g., second interferometer arm 522). The reference cell 526 would be in the other light path, as needed.

As discussed above with regard to processing unit 164, in various embodiments, the processing units 264, 364, 464 and 564 may be implemented using one or more processing devices, such as a computer, a processor, a microprocessor, a DSP, one or more ASICs, one or more FPGAs, or combinations thereof, using software, firmware, hard-wired logic circuits, or combinations thereof. The processing units 264, 364, 464 and 564 may have access to memory (not shown), comprising a non-transitory computer readable medium for storing operating software, modules, data and algorithms for executing the various embodiments described herein, including spectral determination and/or analysis of the analyte(s) of interest. Examples of a computer readable medium include various types of ROM and volatile RAM, such as EPROM, EEPROM, SRAM, DRAM, Block RAM, a disk drive, a CD, a DVD, a USB drive, and the like.

Notably, although the representative embodiments described above include Michelson or Mach-Zehnder interferometers, for purposes of illustration, it is understood that other types of interferometers may be incorporated without departing from the scope of the present teachings. In addition, each of the reflectors described above may be implemented using any various means of reflecting light beams, such as corner cubes, plane mirrors, "cat's eyes," roof prisms, retroreflectors, and the like, without departing from the scope of the present teachings.

Also, it is understood that each of the optical spectroscopy systems 100 to 500 described above may include various additional components known in the art, such as a variable optical attenuator, a polarizer, a half waveplate, and/or a mechanism to misalign the first and second light beams from the first interferometer arm and the second interferometer arm, pursuant to specific applications and/or design specifications.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A system for performing optical spectroscopy measurements, comprising:
    a light source configured to generate an input optical beam;
    an interferometer configured to receive the input optical beam generated by the light source, the interferometer comprising:
        a beam splitter configured to split the input optical beam into a first light beam and a second light beam;
        a first light path configured to direct the first light beam through a sample to a first output port, the sample containing an analyte of interest; and
        a second light path configured to direct the second light beam to the first output port, at least one of the first light path and the second light path being further configured to adjust a relative phase of a corresponding at least one of the first light beam and the second light beam, respectively, so that the first light beam and the second light beam are out of phase at the first output port, substantially canceling background light and outputting sample light corresponding to a portion of the first light signal absorbed by the sample in the sample cell; and a detection system configured to detect the sample light output at the first output port.

2. The system of claim 1, wherein the first light path comprises a sample cell containing the sample and the second light path comprises a reference cell configured to compensate the second light beam for at least one of dispersion and absorption of the first light beam caused by the sample cell and analytes in the sample other than the analyte of interest.

3. The system of claim 1, wherein the first light path comprises a first reflector for reflecting the first light beam to the first output port; and
wherein the second light path comprises a second reflector for reflecting the second light beam to the first output port.

4. The system of claim 1, wherein at least one of the first light path and the second light path further comprises at least one of electromechanical actuator and electro-refractive-index actuator and corresponding servo circuit configured to adjust an optical path length of a corresponding one of the first light path and the second light path, respectively, in order to adjust relative phases of the first light beam and the second light beam.

5. The system of claim 4, further comprising:
a photodetector configured to detect the sample light output at the first output port and to output a feedback control signal in response to the detected light, wherein the at least one of the electromechanical actuator and the electro-refractive-index actuator and the corresponding servo circuit adjust the optical path length of at least one of the first light path and the second light path based on the feedback control signal.

6. The system of claim 1, further comprising:
a spatial filter connected to the first output port and configured to filter the sample light.

7. The system of claim 6, wherein the spatial filter comprises at least one of a pinhole filter and a single mode optical fiber filter.

8. The system of claim 1 further comprising a polarizer at the first output port for defining polarization of the sample light.

9. The system of claim 1, wherein at least one of the first light path and the second light path comprises at least one of a variable optical attenuator, a polarizer, and a half waveplate, respectively.

10. The system of claim 1, wherein the light source comprises a pulsed light source and the input optical beam comprises a plurality of pulses, and a pulse width of each pulse of the plurality of pulses in the input optical beam is shorter than a lifetime of an excited state of analytes in the sample, and
wherein the detection system comprises an optical spectrometer.

11. The system of claim 10, wherein the pulsed light source comprises one of a pulsed laser, a mode-locked pulse laser, a Q-switched laser, an optical parametric oscillator, or an output of a nonlinear optical process.

12. The system of claim 10, wherein the optical spectrometer comprises one of a Fourier transform spectrometer, a combination of a virtual image phase array (VIPA) and a two-dimensional detector array, and a combination of an echelle grating plus a regular grating plus a two-dimensional detector array.

13. The system of claim 1, wherein the light source comprises one of a continuous wave light source and a quasi-continuous wave light source, and
wherein the detection system comprises a photodetector and a processing unit configured to determine a wavelength of the continuous wave light source when data from the sample light is recorded.

14. The system of claim 13, wherein the light source comprises one of a laser and a frequency tunable laser.

15. The system of claim 1, wherein the light source comprises a first optical frequency comb having a first repetition rate, and
wherein the detection system comprises a second optical frequency comb having a second repetition rate different from the first repetition rate, the sample light output at the first output port being sampled by an input optical beam of the second optical frequency comb, and a photodetector detecting one of combined sample light and the input optical beam of the second optical frequency comb to output a detected signal;
an analog-to-digital converter configured to convert the detected signal from the photodetector to a corresponding digital signal; and
a processing unit configured to perform a Fourier transform on the digital signal to provide a corresponding frequency domain signal.

16. The system of claim 1, wherein the light source comprises a first optical frequency comb having a first repetition rate and a second optical frequency comb having a second repetition rate different from the first repetition rate, and wherein the combined output of the first and second optical frequency combs is used as a reference signal for an auto-balanced photodetector for cancellation of intensity noise in the sample light output at the first output port.

17. The system of claim 1, wherein the interferometer comprises a Michelson interferometer.

18. The system of claim 1, wherein the interferometer comprises a Mach-Zehnder interferometer.

19. The system of claim 1, wherein the light source comprises a first optical frequency comb having a first repetition rate, and
wherein the detection system comprises:
a second optical frequency comb having a second repetition rate different from the first repetition rate; and
an auto balanced-photodetector for receiving first and second combined light beams of the sample light output at the first output port and an input optical beam of the second optical frequency comb to output a detected signal, one of the first and second combined light beams being a reference light beam for the auto-balance photodetector, while the other of the first and second combined light beams being a signal light beam for the auto-balance photodetector;
an analog-to-digital converter configured to convert the detected signal from the photodetector to a corresponding digital signal; and
a processing unit configured to perform a Fourier transform on the digital signal to provide a corresponding frequency domain signal.

20. The system of claim 1, wherein the light source comprises a first optical frequency comb having a first repetition rate and a second optical frequency comb having a second repetition rate different from the first repetition rate, a combined output of the first and second optical frequency combs being used as the an input optical beam, and
wherein a detection system comprises a photodetector configured to detect the sample light output at the first output port.

21. A method for performing optical spectroscopy measurements, comprising:
splitting an input optical beam into a first light beam and a second light beam;

directing the first light beam through a first light path of an interferometer to a first output port of the interferometer, the first light beam passing through a sample containing an analyte of interest;

directing the second light beam through a second light path of the interferometer to the first output port;

adjusting phase of at least one of the first light beam and the second light beam so that the first light beam and second light beam are out of phase to substantially cancel background light, and adjusting intensity of at least one of the first light beam and the second light beam so that the first and second light beams have approximately equal intensities;

outputting from the first output port an output optical beam corresponding to a portion of the first light beam absorbed by the sample in the first light path; and detecting a spectrum of the sample from the optical beam output at the first output port.

\* \* \* \* \*

UNITED STATES PATENT AND TRADEMARK OFFICE
CERTIFICATE OF CORRECTION

PATENT NO. : 9,341,516 B2  Page 1 of 1
APPLICATION NO. : 14/015529
DATED : May 17, 2016
INVENTOR(S) : Miao Zhu et al.

It is certified that error appears in the above-identified patent and that said Letters Patent is hereby corrected as shown below:

In the Specification

In column 6, line 31, before "feedback" delete "the".

In column 8, line 40, before "combined" insert -- first and second --.

In column 10, line 15, before "spectroscopy" insert -- optical --.

In the Claims

In column 14, line 40, in claim 19, delete "auto balanced-photodetector" and insert -- auto-balanced photodetector --, therefor.

Signed and Sealed this
Second Day of August, 2016

Michelle K. Lee
*Director of the United States Patent and Trademark Office*